Aug. 24, 1965    J. VILBAJO    3,202,100

PIEZO-ELECTRIC FIRING MECHANISM

Filed Aug. 11, 1961    5 Sheets-Sheet 1

INVENTOR
Jean Vilbajo
PER
Watson, Cole, Grindle & Watson
ATTORNEYS

Aug. 24, 1965  J. VILBAJO  3,202,100
PIEZO-ELECTRIC FIRING MECHANISM
Filed Aug. 11, 1961  5 Sheets-Sheet 2
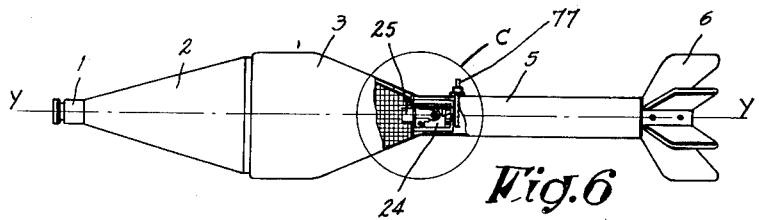
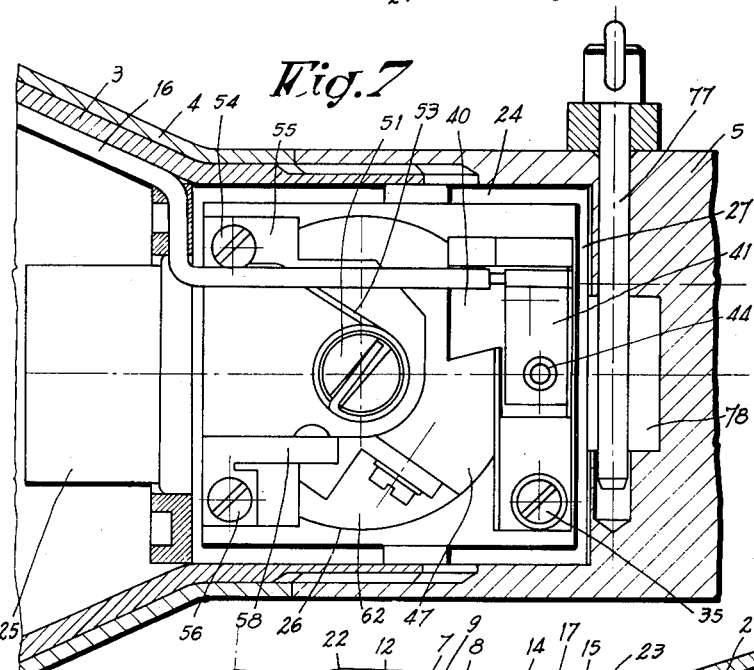
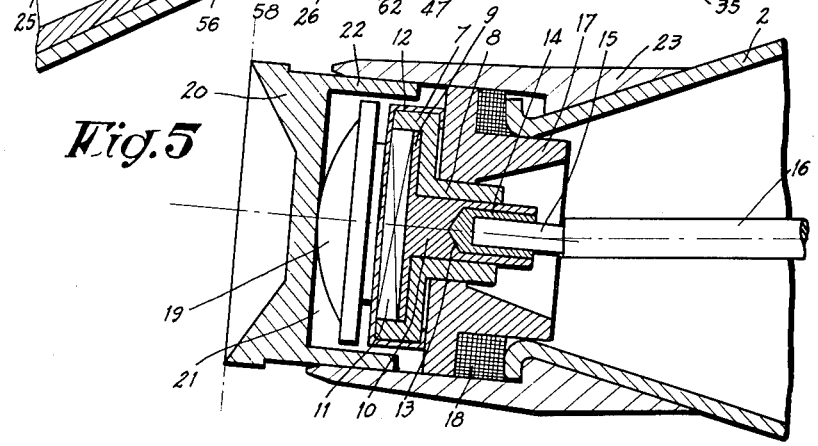
INVENTOR
Jean Vilbajo
PER
Watson, Cole, Grindle & Watson
ATTORNEYS Aug. 24, 1965  J. VILBAJO  3,202,100
PIEZO-ELECTRIC FIRING MECHANISM
Filed Aug. 11, 1961  5 Sheets-Sheet 4
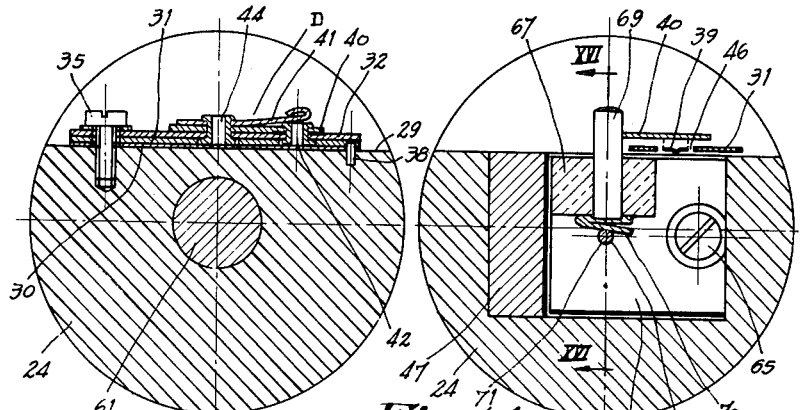
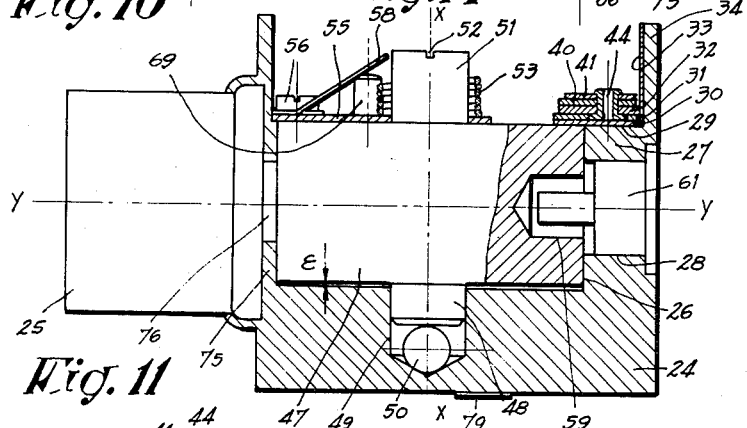
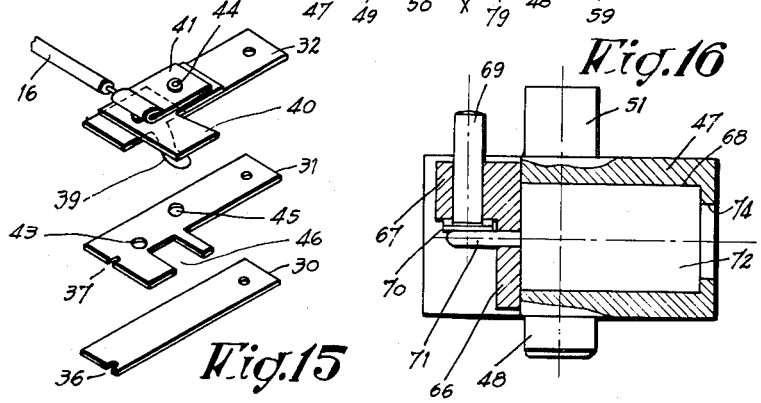
INVENTOR
Jean Vilbajo
PER
Watson, Cole, Grindle & Watson
ATTORNEYS Aug. 24, 1965    J. VILBAJO    3,202,100
PIEZO-ELECTRIC FIRING MECHANISM
Filed Aug. 11, 1961    5 Sheets-Sheet 5

INVENTOR
Jean Vilbajo
PER
Watson, Cole, Grindle & Watson
ATTORNEYS.

United States Patent Office 3,202,100
Patented Aug. 24, 1965

3,202,100
PIEZO-ELECTRIC FIRING MECHANISM
Jean Vilbajo, Burcht, Antwerp, Belgium, assignor to U.M.A.L., Societe Anonyme, Burcht, near Antwerp, Belgium
Filed Aug. 11, 1961, Ser. No. 130,871
Claims priority, application Belgium, June 2, 1961, 40,708, Patent 604,536
6 Claims. (Cl. 102—70.2)

The invention relates to a hollow-charge, rocket-type missile the firing of which is produced on impact by a piezo-electric device incorporated in a striker head, this device closely coacting with an electric fuze.

This combined action requires to be such that the piezo-electric device will on the one hand function reliably whatever the attitude of the missile at the instant of impact with respect to the target, while the electric fuze is required on the other hand to respond correctly to such impulses as may be transmitted to it by the piezo-electric device.

In general, the action of the piezo-electric device develops its maximum effect when the missile is pointing perpendicularly at the target at the instant of impact, when it may be assumed that as a rule the already-known firing means will be sufficiently reliable. This ideal attitude of the missile to the target is, however, hardly ever attained in practice and it consequently becomes necessary to ensure that the piezo-electric device will function or respond with certainty whatever the inclination of the longitudinal axis of the missile with reference to the objective.

Particular means have already been suggested for ensuring that a maximum resultant pressure always acts on the piezo-electric device, whatever the angle of incidence of the missile to the target.

It is true that satisfactory results have been obtained with the means already suggested but it has been observed that these means set up certain frictional forces in the nose of the missile, whereby the safeguards provided by the arming devices become at least in part inoperative.

The primary object of the present invention is to provide means for ensuring the reliable functioning of the piezo-electric device whatever the angle of fall of the missile. A further object is to provide means to be incorporated in the electric fuze in order to enable it to respond to any pulses transmitted to it by the piezo-electric device.

A missile, according to the invention, comprises a priming device, a striker head, an electric circuit interconnecting said striker head and said priming device by means of an electric conductor and a normally open contact having a first and a second contact member, and an electric fuze incorporating said priming device and means for closing said contact, said striker head comprising from the front to the rear of said missile a movable striker element, a convex pressure pad, a piezo-electric device and an elastic seating. Hereby the elastic seating ensures a maximum concentration of the impact forces in the direction of the center of the piezo-electric device irrespective of the angle of fall of the missile.

The missile according to the invention incorporates in combination with the said improved form of nose striker an electric fuze similarly arranged to ensure reliable closing of the firing circuit. Its functioning is principally determined by high sensitivity of the moving parts of the fuze to the inertia forces generated at the instant of launching of the missile, and secondly by a particular arrangement of the contact elements acting between the moving and fixed parts of the fuze to complete the electric circuit energized by the said piezo-electric device. Similarly, the fuze incorporates safety means preventing any closing of the firing circuit by accidentally-imparted shocks.

This combination of characteristic features simultaneously in the striker head and the fuze of the missile ensures exceptional reliability of functioning of the fuze as well as an absolute safeguard against faulty action thereof.

The particular features incorporated in the striker head and the fuze will be more evident from the following detailed description of an exemplary and entirely non-restrictive form of an embodiment with reference to the accompanying drawings, wherein:

FIG. 5 is a radial longitudinal section similar to those in FIGS. 3 and 4 with the missile nose in a position midway between those of FIGS. 3 and 4;

FIG. 6 is a diagrammatic elevation similar to FIG. 1 indicating more particularly the position of the fuze;

FIG. 7 is a sectional view on a larger scale of the part marked C in FIG. 6;

Figure 8:
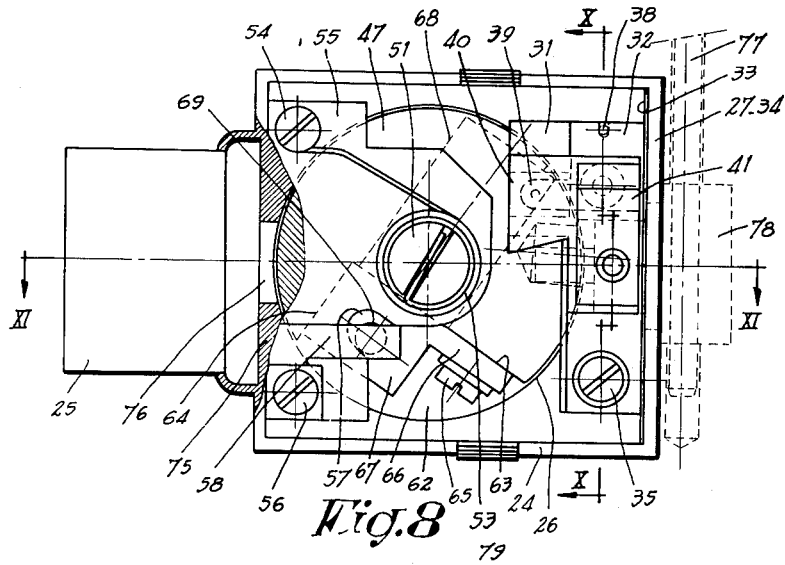
FIG. 8 is a partially-sectional plan view of the electric fuze in the dead position.
Figure 9:
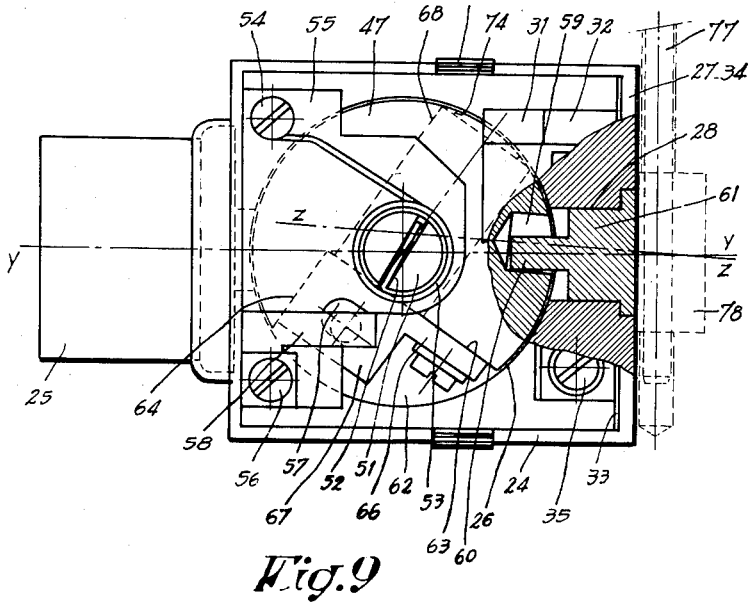
FIG. 9 is a plan view similar to FIG. 8 with a further partial section, more particularly showing the rotor locking means.
Figure 12:
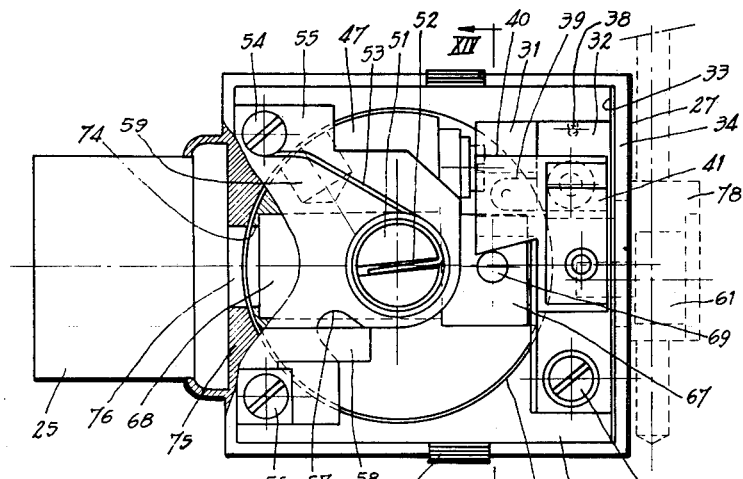
Figure 13:
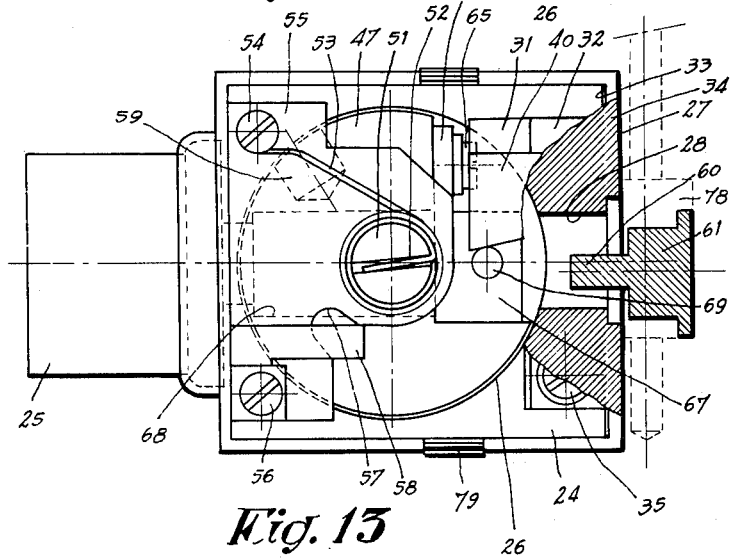

FIGS. 10 and 11 respectively show sections along the lines X—X and XI—XI of FIG. 8;

FIG. 12 is a view similar to that in FIG. 8, showing the fuze in its position after launching of the missile;

FIG. 13 is a view similar to FIG. 9, the fuze being shown in the same position as in FIG. 12;

FIG. 14 is a section along the line XIV—XIV of FIG. 12;

FIG. 15 is an exploded view of the part shown at D in FIG. 10;

FIG. 16 is a section along the line XVI—XVI in FIG. 14.

Referring to the drawings, FIGS. 1 to 6, the missile incorporating the characteristic features of the invention is of the rocket type, essentially incorporating a striker head 1, a nose or war-head 2, a body 3, an electric fuze 4, a tail 5 and guide fins 6.

The characteristic features of the invention are the striker head 1 and the electric fuze 4, as well as the combination and intimate and permanent association between the elements 1 to 4 of the missile, the coaction of which determines the essential characteristics of reliability and safety of the said missile.

The striker head consists essentially of a shallow cup 7 merging into a tube 8 and containing a disc 2 from which a cylindrical stem 10 extends through the tube 8. The disc 9 carries a piezo-electric crystal 11, which is enclosed by the disc 9, the surrounding part of the cup 7 and a thin metallic casing 12.

The stem 10 has a blind axial bore 13 into which is fixed, by a bush of solder 14, the adjacent end 15 of an electric conductor 16 connecting the piezo-electric device 7 to 12 with the electric fuze 4.

This piezo-electric device rests on a guide ring 17 fitted inside the opening of the nose 2 and bearing with its annular shoulder on an elastic seating ring 18 which is itself supported on the splayed part of the opening of the nose 2. A convex pressure pad 19 is in contact with the upper surface of the casing 12 of the piezo-electric crystal and is itself acted upon by the movable striker element 20. The element 20 is hollow at 21 and its cylindrical rim 22 partly overlaps the pressure pad 19 and a part of the crystal casing, the lower edge of this rim being held at a small distance from the adjacent edge of the guide ring 17. Further the cylindrical rim 22, the underlying piezo-electric device 7 to 12, the guide ring 17 and the elastic seating 18 are enclosed in a common casing 23 fitting under the flare of the nose rim 2 and holding the moving striker element 20 in place peripherally.

In the FIGS. 11 and 15 the electric conductor 16 leads to the electric fuze which consists essentially of a hollow cylindrical body 24, extended by a threaded neck 25 in the direction of the nose or head 2 of the missile. This neck 25 has a cylindrical recess 26 the axis X—X of which is perpendicular to the axis Y—Y of the electric fuze, with reference to the missile itself. The rear wall 27 of the fuze has a central hole 28 with two bores the larger of which is adjacent to the rear surface of this wall. The same rear wall 27 has at the top a flat 29 on which there is attached a contact blade assembly constituted by three superposed strips of insulating material 30, 31, 32 and by three metal contact blades 39, 40, 41, one strip of insulating material 33 being attached to the adjacent surface of the wall 34. The strips 30, 31, 32 are all held in place by a screw 35 passing through the underlying part of the underlying rear wall 27. In this manner, these strips are firmly held in place.

On the top strip 32 of insulating material there rest the three small metal contact blades 39, 40, 41. The contact blades 39, 40 are pierced and held together by a rivet 42 which passes through the strip of insulating material 32, the lower head of this rivet being lodged in a corresponding hole 43 of the strip of insulating material 31; the metal contact blades 40, 41 being further held together by a second rivet 44 the lower head whereof is lodged, as in the previous case, similarly in a hole 45 of the strip of insulating material 31. The electrical conductor wire 16 is attached by its second free end to the upper or first metal contact blade 41. The lower or third contact blade 39 has a slanting edge and passed through a slot 46 in the underlying part of the strip of insulating material 31 in such manner as to leave a bottom end below the overlapping part of the second metal contact blade 40. The cylindrical chamber 26 of the body of the electric fuze contains a rotor the downward coaxial extension 48 of which passes with a slight friction fit into a blind hole 49 in the bottom of the said cylindrical recess or chamber 26 and, by means of this extension piece, the rotor is able to bear freely on a ball 50 which rests freely in the bottom of the blind hole 49. This ensures, simultaneously, permanent centering of the ball, and the minimum surface contact between the rotor and its underlying bearing; a very small clearance remaining between the lower annular face of the rotor and the bottom of its seating.

The upper face of the rotor has a central boss 51 the end face of which has a diametral groove 52 into which enters and is attached one of the free ends of a coil spring 53 passing round the said boss, the other free end of the spring 53 being attached by a screw 54 entering the corresponding part of the fuze body. This spring exerts a continuous force on the rotor, tending to rotate it on its axis. For this purpose, furthermore, the rotor is centered by means of a small stop plate 55 attached to the fuze body by means of the screw 54 and a screw 56; the boss or pin 51 of the rotor passing freely through the plate 55. This same plate also has a stop notch 57 the purpose of which will be described presently. The screw 56 at the same time attached to the plate 55 an upwardly bent tongue 58 extending above the notch 57. The rotor, FIG. 9, has further a transverse blind hole 59 the longitudinal axis Z—Z of which slants slightly with reference to the longitudinal axis Y—Y of the fuze body when the rotor is in the resting position, i.e., before the missile is launched. The hole 59 receives the threaded end 60 of a bolt 61 held with a push fit in the hole 28 of the rear wall 27 of the fuze body. In addition, the rotor 47 has a wide notch 62 extending between two flat right-angled edges 63, 64.

On the edge face 63 there is attached by means of a screw 65 a strip of insulating material 66 having a slight overlap 67.

This strip of insulating material covers the adjacent end of the radial bore 68, FIG. 16, passing through the corresponding part of the rotor. A pin 69 passes through the overlapping part 67 and projects slightly above it, where it serves for the attachment of a contact blade 70. This latter is usually in contact with a pin 71 forming part of a primer 72 and passing through a corresponding hole 73 in the insulating strip 66.

The primer 72 is held in a transverse socket 68 which has a circumferential shoulder 74 against which there abuts the corresponding end of the primer. The front face 75, FIG. 11, of the cylindrical fuze body 24 has an aperture 76 coaxial with the rear aperture 28 and in line with the transverse bore 68 when the rotor 26 has been rotated about its axis X—X at the instant when the missile has been launched, FIG. 13.

Finally, behind the adjusted electric fuze a locking pin 77, FIG. 9, is passed through a corresponding part of the fuze body which is normally held very closely to the rear face of the bolt 61, thus preventing the latter from unintentionally falling out, in spite of the presence of a clearance space 78 in the corresponding part of the rocket tail, in line with the aperture 28.

With a view to facilitating the securing or locking of the electric fuze in the associated cylindrical socket in line with the body 3 of the missile, the cylindrical fuze socket 24 may be provided in its central part with a knurled, ribbed or otherwise profiled ring 79 in such manner that the diameter of the circle circumscribed around the projections thus created is slightly greater than the external diameter of the cylindrical body 24 and greater than the internal diameter of the cylindrical bore in line with the body 3 of the missile.

The functioning of a rocket missile equipped with these improvements is essentially as follows: Assuming the missile to be at rest, the striker head has its different constituent elements in the relative positions shown diagrammatically in FIG. 3, and the fuze is set in the manner shown in FIGS. 7, 8, 9. In this position, the electric circuit connected with the firing pin 71 is open, since the pin 69 is away from the metal contact blade 40 which is continuously in contact with the upper metal contact blade 41 to which is connected the conductor 16 coming from the striker head. During this dead or resting period the electric fuze is set in such manner that the metal case of the primer 72 is grounded through the firing pin 71, the contact blade 70, the pin 69, the tongue 58, the screw 56 and the body 24 of the fuze, as well as all the metal parts in contact therewith.

Similarly, the conductor 16 leading from the striker head is, in the same dead or resting position of the fuze, grounded through successively, the three metal contact blades 41, 40, 39 and the rotor 26, as well as all the metal parts in contact therewith.

When the missile is to be loaded on the launcher, the locking pin 77 is removed. The fuze is automatically armed at the instant of launching. This is effected in such manner that the rotor 26 turns slightly by inertia against the force of the return spring 53 which relieves the threaded end 60 of the bolt 61 from any lateral thrust or retaining effect. Similarly the bolt 61 consequently slips out of its seating 28 by inertia and drops into the clearance space 78.

The rotor being thus completely free, the action of the return spring 53 brings it into the armed position as shown in FIGS. 12 and 13. In this position, the diametral bore 68 of the rotor and the primer 72 come in line with the front aperture 76, and simultaneously the pin 69, electrically connected with the firing pin 71 of the primer 72, is forced against the blade 40, thus making free contact therewith. In this position, the electric conductor 16 is connected with the pin 71 through the contact blade 70, the pin 69 and the blades 40 and 41.

Figure 1:
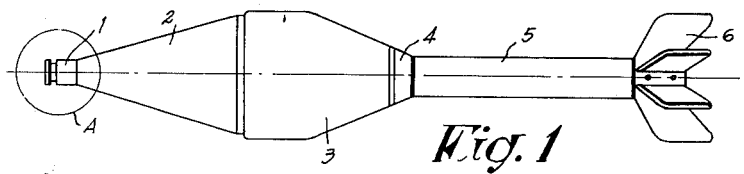
FIG. 1 is a diagrammatic side view of an improved missile according to the invention.
Figure 2:
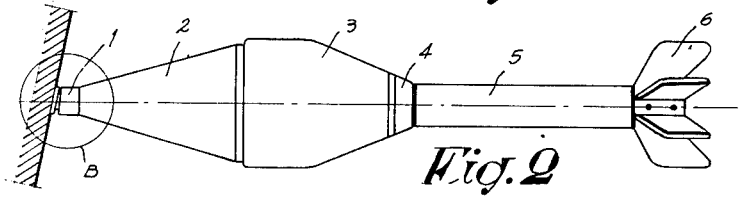
FIG. 2 is a view similar to FIG. 1 showing the missile contacting a slightly-inclined target.
Figure 3:
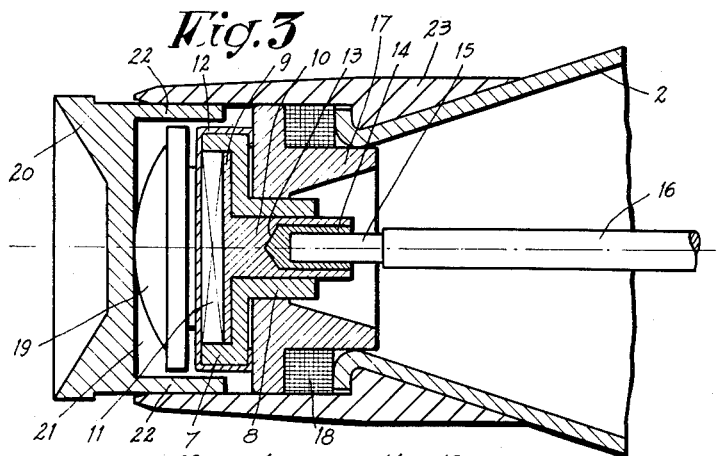
FIG. 3 is a radial longitudinal section of the missile striker head shown at A in FIG. 1.
Figure 4:
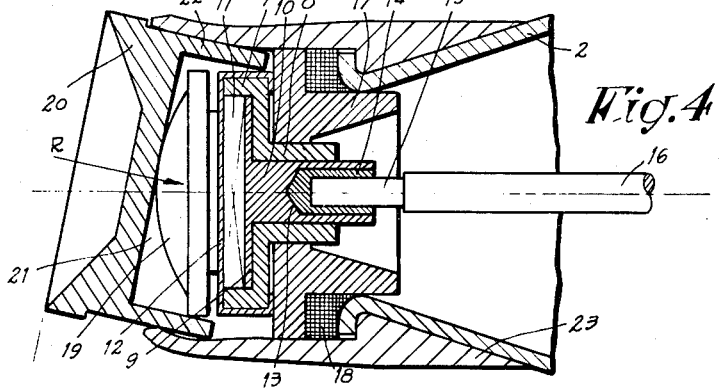
FIG. 4 is a radial longitudinal section of this striker head in the position shown at B in FIG. 1.

If the missile now strikes an object perpendicularly to its longitudinal axis, the movable striker element 20 is driven against the convex pressure pad 19 which in turn presses on the piezo-electric crystal 11. In a known manner, the resulting current is applied to the primer 72 through the firing pin 7, thus ensuring the firing of the missile charge. Should the missile strike an object inclined from the longitudinal axis of the former, it is possible reliably to guarantee the response of either of the two reactions of the striker head, represented in FIGS. 4 and 5. In FIG. 4, the impact shock being localized in a particular part of the periphery of the movable striker element 20, the latter will slide over the convex surface of the pressure pad 19 when the resultant R of the thrust force will be directed towards, or approximately towards, the centre of the piezo-electric crystal 11. Consequently, even for comparatively small angles if impact on the target, the current generated in the piezo-electric crystal will always be at a maximum; which guarantees a reliable firing of the missile charge, particularly since this arrangement coacts with the characteristic arrangements of the electric fuze.

In the case represented by FIG. 5, practically the whole striker head participates in the angular displacement with respect to the longitudinal axis of the missile. This simultaneous co-action of all the constituent elements of the striker head is effected by the local deflection of the elastic seating 18. In such case, even if, in practice, the movable striker element 20 acts practically identically on the convex pressure pad 19, the resulting impact force will be applied equally to, or approximately to, the centre of the piezo-electric crystal 11.

Therefore, as will be seen, the combined and simultaneous action of the improved striker head and electric fuze ensures an exceptional, functional reliability, even for relatively small, or relatively very large, angles of impact.

The present invention essentially applies to any similarly adjusted missile, as well as to the essential characteristic features of the striker head and the electric fuze, jointly or severally.

What I claim is:

1. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, said striker head comprising a guide ring which is interposed between said piezo-electric device and said elastic seating and a common casing forming parts of the front end of said missile holding in place the constituent parts of said striker head so that the constituent parts of said striker head are held in place by the common casing forming part of the front end of said missile.

2. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, said striker head comprising a guide ring which is interposed between said piezo-electric device and said elastic seating and a common casing forming part of the front end of said missile holding in place the constituent parts of said striker head so that the constituent parts of said striker head are held in place by the common casing forming part of the front end of said missile, the front end of said missile having an opening therein and said guide ring has a front part constituting a bearing element for said piezo-electric device and a rear part projecting in said opening.

3. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, wherein the front end of said missile has an opening with a splayed part, and wherein said elastic seating having the shape of a ring and the front part of said ring constituting an annular shoulder and said elastic seating is enclosed between the splayed part of said opening and an annular shoulder.

4. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, said piezo-electric device being constituted by a piezo-electric crystal, a cup and a disc, said piezo-electric crystal being supported by said cup which is rearwardly prolonged by a solid stem having at its free end a blind axial bore, and said disc rests on said cup, one end of said electric conductor forming part of said electric circuit being fixed in said blind axial bore, and wherein said electric fuze comprises a cylindrical body and a rotor mounted therein, and wherein said rotor having a rest position and an operative position the other end of said electric conductor is connected to a contact blade assembly formed by a first, a second and a third contact blade which are superposed and separated by two strips of insulating material, said assembly being fixed on a rearwardly located flat surface of said cylindrical body, and wherein said first contact blade of said contact blade assembly is connected to said electric conductor, said second contact blade having an overlapping tongue acting as a stop and forming said first contact member, and said third contact blade being folded back downwardly and making contact with said rotor when said rotor is in said rest position.

5. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, said piezo-electric device being constituted by a piezo-electric crystal, a cup and a disc, said piezo-electric crystal being supported by said cup which is rearwardly prolonged by a solid stem having at its free end a blind axial bore, and said disc rests on said cup, one end of said electric conductor forming part of said electric circuit being fixed in said blind axial bore, wherein said electric fuze comprises a cylindrical body and a rotor mounted therein, and wherein said rotor having a rest position and an operative position the other end of said electric conductor is connected to a contact blade assembly formed by a first, a second and a third contact blade which are superposed and separated by two strips of insulating material, said assembly being fixed on a rearwardly located flat surface of said cylindrical body, and wherein said first contact blade of said contact blade assembly is connected to said electric conductor, said second contact blade having an overlapping tongue acting as a stop and forming said first contact member, and said third contact blade being folded back downwardly and making contact with said rotor when said rotor is in said rest position, and wherein said rotor is provided with a blind hole in which is engaged a part of a bolt in order to hold said rotor in said rest position and wherein said rotor has a diameter which is considerably larger than said part of said bolt the longitudinal axis of which is inclined with respect to the longitudinal axis of said rotor when said fuze is in the rest position, and wherein said second blade has a slanting edge which is substantially perpendicular to a contact blade forming said second contact member and carried by said rotor.

6. A hollow-charge missile comprising a priming device, a striker head, an electric circuit interconnecting said striker head and said priming device by means of an electric conductor and a normally open contact having a first and second contact member, and an electric fuze incorporating said priming device and means for closing said contact, said striker head comprising from the front to the rear of said missile a movable striker element, a convex pressure pad, a piezo-electric device and an elastic seating, a primer with a first pin and a rotor having a rest position and an operative position is provided which has a wide lateral slot in which is located a piece of insulating material through which passes a second pin which constitutes the second contact member, and said second pin is attached to an elastic contact blade resting on said first pin and said second pin has a lower end, in the rest position of said fuze, in contact with one end of another elastic blade the other end of which has an upper end which is attached to a metal part of said rotor and is grounded.

References Cited by the Examiner

UNITED STATES PATENTS

| | | | |
|---|---|---|---|
| 444,537 | 1/91 | Merriam | 102—73 |
| 2,047,884 | 7/36 | Remondy | 102—73 |
| 2,415,262 | 2/47 | Semple | 102—73 |
| 2,849,957 | 9/58 | Kuller et al. | 102—70.2 |
| 2,853,011 | 9/58 | Will et al. | 102—70.2 |
| 2,991,716 | 7/61 | Israel et al. | 102—70.2 |

SAMUEL FEINBERG, *Primary Examiner.*